United States Patent
Mahlberg et al.

(10) Patent No.: US 7,992,696 B2
(45) Date of Patent: Aug. 9, 2011

(54) CONSTRUCTION MACHINE, AS WELL AS CLUTCH FOR SWITCHING THE POWER FLOW

(75) Inventors: Axel Mahlberg, Hennef (DE); Lothar Schwalbach, Asbach (DE); Günter Hähn, Königswinter (DE)

(73) Assignee: Wirtgen GmbH (DE)

( * ) Notice: Subject to any disclaimer, the term of this patent is extended or adjusted under 35 U.S.C. 154(b) by 436 days.

(21) Appl. No.: 12/219,335

(22) Filed: Jul. 21, 2008

(65) Prior Publication Data

US 2009/0020388 A1 Jan. 22, 2009

(30) Foreign Application Priority Data

Jul. 20, 2007 (DE) .................... 20 2007 010 294 U

(51) Int. Cl.
*E01C 23/00* (2006.01)
*F16D 25/0638* (2006.01)
*F16F 15/10* (2006.01)
(52) U.S. Cl. ..... 192/48.3; 192/65; 192/70.17; 192/70.2; 192/30 V; 192/105 CD; 299/39.4
(58) Field of Classification Search .................. None
See application file for complete search history.

(56) References Cited

U.S. PATENT DOCUMENTS

| | | | | | |
|---|---|---|---|---|---|
| 1,437,319 | A | * | 11/1922 | Landis | 192/70.27 |
| 3,584,720 | A | * | 6/1971 | Bark et al. | 192/70.28 |
| 4,724,941 | A | * | 2/1988 | Wirkner | 192/52.2 |
| 5,613,586 | A | * | 3/1997 | Schilling et al. | 192/48.3 |
| 5,653,321 | A | * | 8/1997 | Takaoka et al. | 192/70.17 |
| 6,033,031 | A | * | 3/2000 | Campbell | 299/39.1 |
| 6,033,335 | A | * | 3/2000 | Hotta et al. | 475/269 |
| 6,543,596 | B2 | * | 4/2003 | Martin et al. | 192/85.4 |
| 6,702,081 | B2 | * | 3/2004 | Gorman et al. | 192/52.2 |
| 2005/0279605 | A1 | * | 12/2005 | Sowul et al. | 192/48.91 |
| 2009/0051210 | A1 | * | 2/2009 | Busley et al. | 299/39.4 |

FOREIGN PATENT DOCUMENTS

WO WO 02/01005 A1 1/2002
WO WO2006108757 * 10/2006

* cited by examiner

*Primary Examiner* — David D Le
*Assistant Examiner* — Jacob S Scott
(74) *Attorney, Agent, or Firm* — Waddey & Patterson, P.C.; Lucian Wayne Beavers

(57) ABSTRACT

Construction machine, with working drum mounted at a machine frame, combustion engine for driving the working drum, drive train between the combustion engine and the working drum, and clutch in the drive train, where the clutch is arranged between a drive shaft and output shaft of the drive train, clutch elements on drive side capable of being engaged with clutch elements on output side, where clutch elements on the drive side or on output side are provided with several clutch part elements that are permanently engaged with one another via at least one mechanical coupling, it is provided that a braking device acting between the drive shaft and the output shaft is arranged at the clutch, said braking device being additionally engaged during engagement of the clutch in order to eliminate or reduce any rotary vibrations caused by play of mechanical coupling between clutch part elements.

16 Claims, 7 Drawing Sheets

CONSTRUCTION MACHINE, AS WELL AS CLUTCH FOR SWITCHING THE POWER FLOW

BACKGROUND OF THE INVENTION

The invention relates to a construction machine, as well as a clutch for a construction machine.

Such construction machines are known, for example, from WO 02/01005. The combustion engines of the newer generation, in particular diesel engines, used in such construction machines generate rotary vibrations of significant proportions due to the lightweight design. This results partly from the fact that light components, in particular light crankshafts and flywheels, are increasingly used, and from the fact that the combustion process happens differently as a result of altered ignition times and injection times due to exhaust emission stipulations, which leads to the generation, to an increasing extent, of rotary vibrations in the output train.

The significant extent of rotary vibrations creates problems, however, with downstream drive mechanisms in the drive train like, for instance, with downstream clutches and gearboxes. These rotary vibrations can intensify even further in such clutches and gearboxes due to mechanical couplings, in particular form-fitting couplings, that have play. Material fatigue, as well as wear and tear can increase considerably, which can lead to a reduced service life of the elements in the drive train. In the process, a progressive reinforcement effect can be observed, because wear and tear caused by these damaging vibrations inevitably leads to increased play, by which the vibrations are in turn reinforced. This problem exists in construction machines in general, and in particular in automotive road milling machines, stabilizers or recyclers, as well as in crushing plants, for example, jaw crushers or impact crushers.

SUMMARY OF THE INVENTION

It is an objective of the present invention to create a construction machine and a clutch in which wear and tear of the drive train elements, and in particular the clutch, due to the unwanted rotary vibrations is reduced in an advantageous manner.

The invention provides in an advantageous manner that a braking device acting between the drive shaft and the output shaft is arranged at the clutch, the braking device being additionally engaged, or capable of being engaged, during engagement of the clutch, in order to eliminate or to reduce any rotary vibrations that are due to play of the mechanical coupling between the part elements of the clutch.

The invention permits in an advantageous manner to damp or to eliminate the rotary vibrations generated at the clutch.

The braking device may be capable of being additionally engaged immediately prior to, during or after switching of the clutch, and may then be engaged until separation of the engagement of the clutch. The braking device causes the part elements of the clutch, within the inevitably existing play of the mechanical coupling of the same, to rest against one another in the direction of the driving torque, and to be fixed in this position by the braking device, so that the toothings of the part elements of the clutch cannot vibrate to and fro in relation to one another within the existing play in case of a non-load operation, i.e. in idle operation, when the clutch is switched and without a load torque at the output shaft. In that way, wear and tear is avoided in the drive train and in particular at the part elements of the clutch, so that the service life of the clutch and other elements of the drive train is prolonged considerably.

The braking force generated by the braking device may be adjusted in such a manner that the braking torque between the drive shaft and the output shaft resulting from the braking force is smaller than the load torque of the output shaft in working mode, and is larger than the drag torque of the output shaft when the rotating working drum is not in working mode.

It is preferably provided that the braking force couples the part elements of the clutch on the drive side or output side to one another in such a manner that the mechanical coupling is play-free at least in the direction of the load operation, i.e. in the direction of the driving torque. The braking torque is then smaller than the maximum torque in the direction of the load, and larger than the maximum torque in the opposite direction (the difference torque from the two being the drag torque of the drum), by way of which a single slipping-through to where the part elements of the clutch rest against one another takes place in the direction of the load, but slipping-through is avoided in the opposite direction. If the braking torque is smaller than the maximum torque against the direction of the load, meaning smaller than the smaller one of the two torques, then slipping-through, and thus the rotary vibration caused by the play of the mechanical coupling, cannot be eliminated but can at least be reduced.

The braking force generated by the braking device may be adjusted in such a manner that the braking torque between the drive shaft and the output shaft resulting from the braking force is larger than the maximum torque occurring in the drive train in non-load operation. In that way, it is ensured that the elements of the mechanical coupling that have play remain in a position defined by the braking engagement at all times, as long as the operating mode of non-load operation is given.

It goes without saying that the braking device is of no effect for the operation of the working drum under load, because the load torques are then many times higher than the braking torque adjusted. In this operating mode, an effect of the braking device is also not required because the part elements of the clutch are pre-tensioned so strongly due to the extremely high torques then being transmitted that any vibrating of the part elements of the clutch against one another is not possible.

The mechanical coupling between the part elements of the clutch on the drive side or output side preferably consists of at least one toothing.

The braking device is provided with at least one brake lining, which is arranged at a clutch element of the clutch on the drive side and/or the output side. The adhesive friction of the brake lining is designed in such a manner that, in non-load operation, the drive side of the clutch is coupled to the output side of the clutch in a practically rigid manner. It is essential in this regard that no slippage can occur at the braking device in non-load operation.

The braking device may be provided with an annular flange which is elastic in axial direction and, when in operation under friction lock, is engaged with an axial resting surface of a clutch element on the drive side or output side.

Alternatively, the braking device may be provided with radially acting brake linings that may interact with corresponding radial resting surfaces of a clutch element on the drive side or output side.

In a preferred embodiment, it is provided that at least one part of the braking device is arranged in a non-rotating manner at a movable part of the clutch elements on the output side. An axially movable pressure piston on the output side that engages the friction linings of the clutch, for example, is suited to this purpose.

The braking device may be engaged with a front surface or a circumferential surface of a hollow ring that is coupled to the drive shaft or output shaft in a non-rotating manner and forms a part element of the clutch.

A preferred embodiment provides that the movable clutch elements on the output side are capable of being operated hydraulically, and that the annular flange of the braking device is coupled to the hydraulic piston for the operation of the clutch.

In a radially acting braking device, the brake lining may be engaged through centrifugal forces during rotation of the output shaft.

An electromagnetic brake or an eddy current brake may be used as an alternative braking device.

The drive train comprises, for example,
a clutch for switching the power flow,
a traction mechanism with drive elements and output elements,
a planetary gear for the working drum, and/or
an elastic coupling, and/or
a pump transfer case.

At least one vibration damper and/or vibration absorber may additionally be arranged at the working drum or in the drive train downstream of the combustion engine, the said vibration damper and/or vibration absorber serving the purpose of eliminating or at least reducing any rotary vibrations generated by the combustion engine.

The vibration damper and/or vibration absorber preferably consists of an elastomer-metal composite element. The vibration damper and/or vibration absorber may consist of an additional mass or vibrating mass arranged coaxially to that particular shaft in which the rotary vibrations of the combustion engine are occurring, where the additional mass or vibrating mass is capable of being excited to rotary vibrations that counteract the rotary vibrations of the combustion engine because of inertia.

In the following, an embodiment of the invention is explained in more detail with reference to the drawings.

BRIEF DESCRIPTION OF THE DRAWINGS

Figure 1:
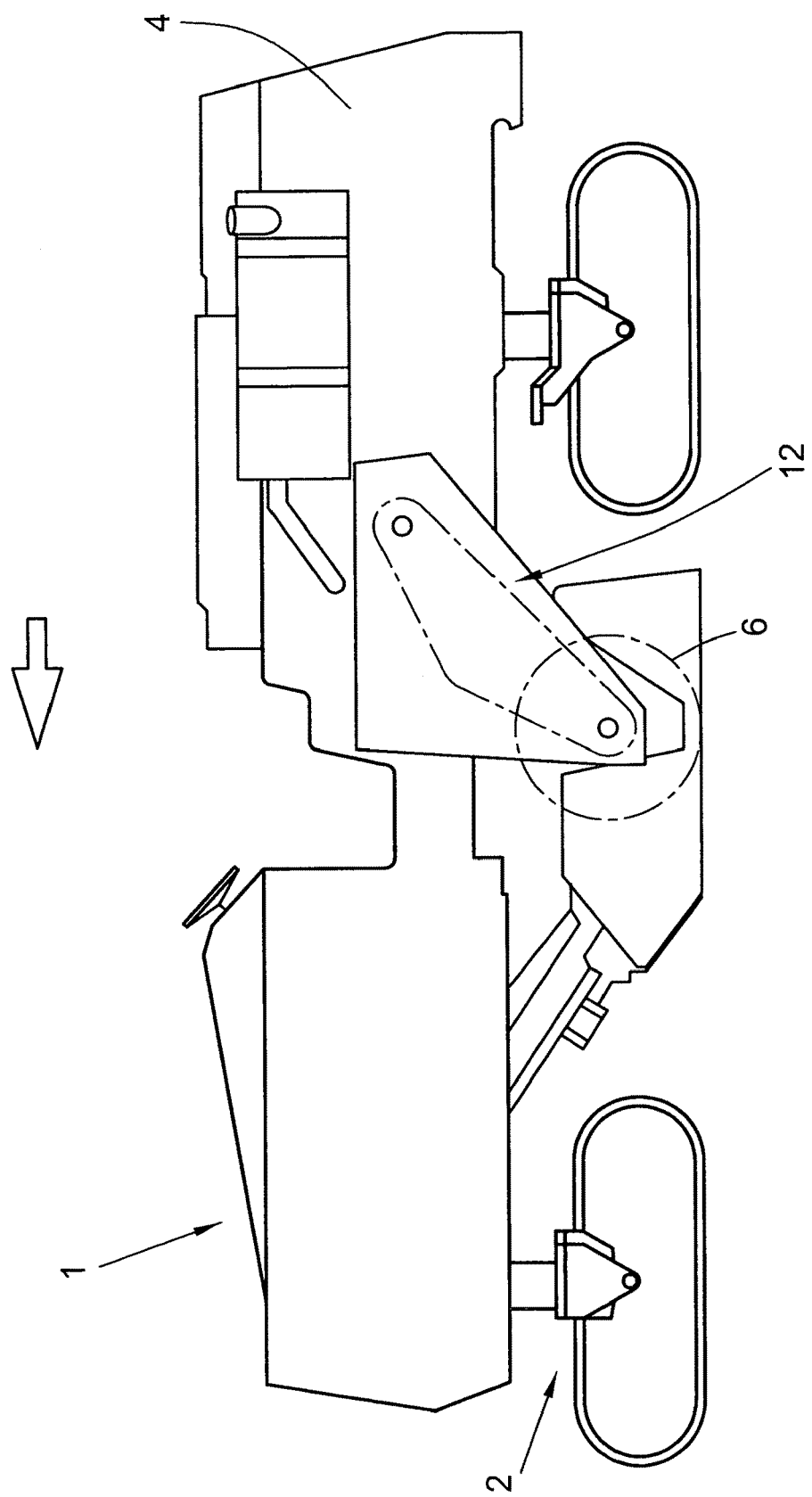
FIG. 1 is a road construction machine.

FIG. 1 shows a construction machine 1 in the form of a large milling machine with a machine frame 4 carried by a height-adjustable chassis 2, and a drive engine 10. A working drum 6 with tools consisting of milling bits for working a pavement surface is mounted at the machine frame 4. The working drum 6 is driven by a drive train 8. The drive train 8 includes at least one traction mechanism 12.

Figure 2:
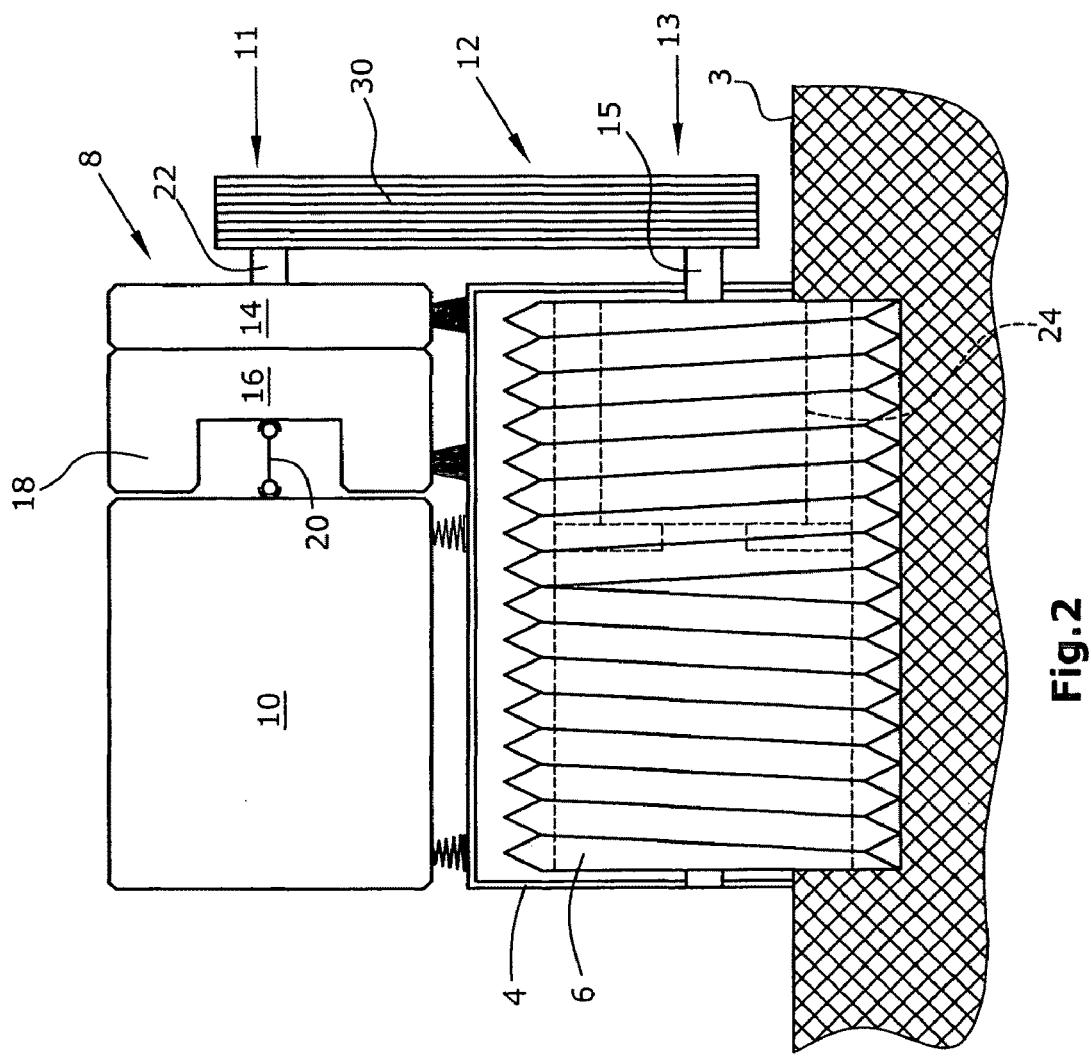
FIG. 2 is a schematic depiction of a drive train in the road construction machine.

FIG. 2 shows a schematic cross-section of a construction machine 1, namely in particular a road milling machine, a recycler or a stabilizer with a working drum 6 that is mounted in a machine frame 4. Alternatively, the working drum 6 may be mounted in a drum housing that is in turn firmly attached to the machine frame. The working drum 6 may also be mounted to pivot at a machine frame 4. The machine frame 4 is carried by a chassis 2 that is depicted in FIG. 1. The working drum 6 may consist of, for instance, a milling drum 6.

The drive engine 10 preferably consists of a diesel engine. Via an elastomer coupling 20, the combustion engine 10 may be coupled to a pump transfer case 16 for driving hydraulic modules, for instance, hydraulic pumps 18. The elastomer coupling 20 may also be arranged at a different place within the drive train 8.

A traction mechanism 12 for the mechanical drive of the working drum 6 is provided with a drive element 11 which is coupled to an output shaft 22 in a non-rotating manner, and an output element 13 which is coupled to the drive shaft 15 of the working drum 6 in a non-rotating manner. A planetary gear 24 may additionally be arranged between the drive shaft 15 and the working drum 6.

The traction mechanism 12 is preferably a belt drive, where the drive elements and output elements consist of belt pulleys 11, 13, with several drive belts 30 revolving around the belt pulleys 11, 13. Alternatively, the traction mechanism 12 may also consist of a chain drive, with the drive elements and output elements then consisting of sprockets.

The drive train 8 is further provided with a conventional device for switching the torque, which is arranged in the drive train 8 between the drive engine 10 and the working drum 6, and preferably consists of a clutch 14 of, for instance, the Planox® clutch type.

The drive engine 10 or the pump transfer case 16 respectively may be coupled to the belt pulley 11 on the engine side via the clutch 14. The working drum 6 is mounted at the machine frame 4. A reduction gear, for instance, a planetary gear 24 may be arranged in the working drum 6, which decreases the speed of the belt pulley 13 on the drum side in a ratio of, for instance, 1:20. The working drum 6 can thus work at a working speed of approximately 100 rpm when the combustion engine 10 is operated at a speed of, for instance, 2000 rpm, and the traction mechanism 12 has a gear ratio of 1:1.

Figure 3:
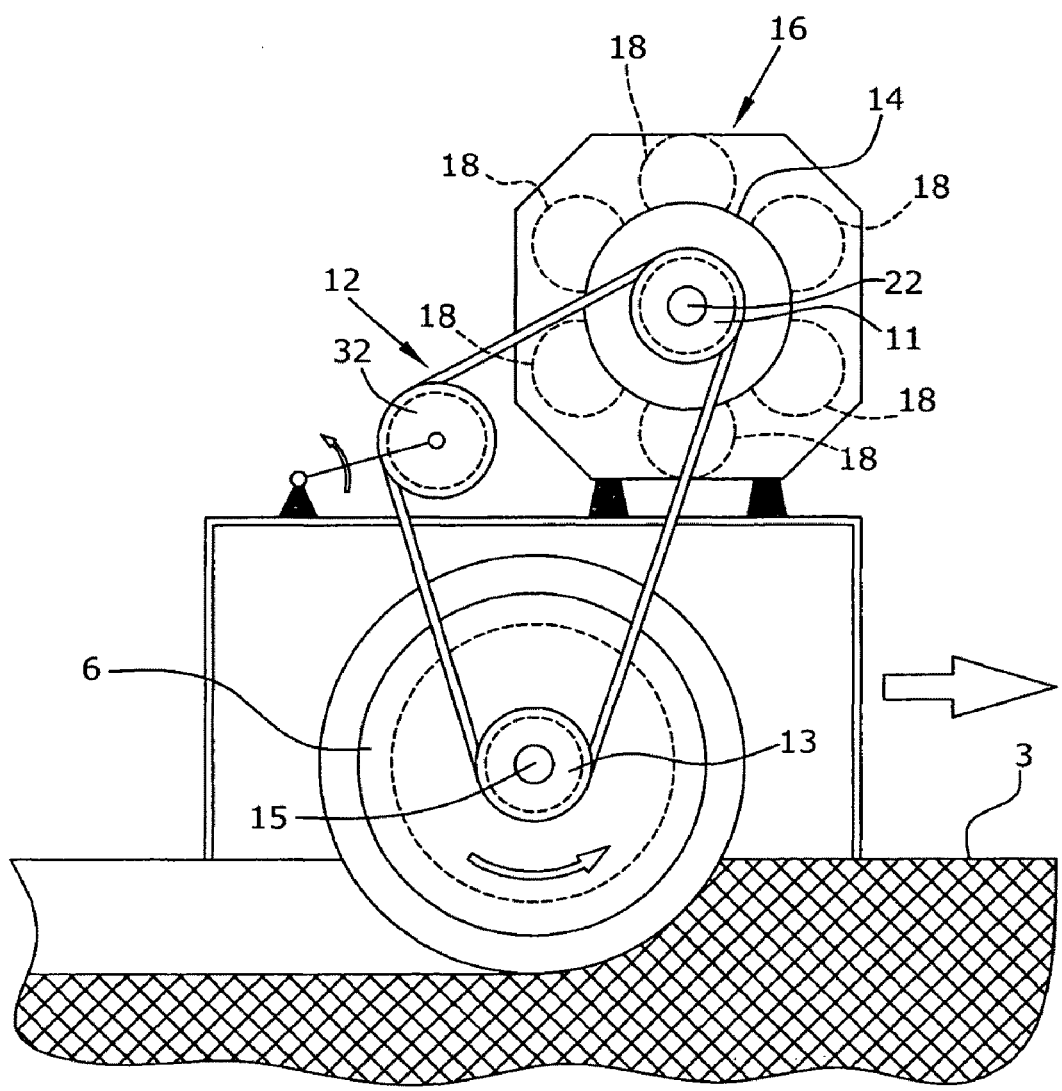
FIG. 3 is a schematic side view of the drive train.

As can be seen from FIG. 3, the pump transfer case 16 is provided with, for instance, six hydraulic pumps 18 that are arranged in a circular manner and with, for instance, the same mutual distance to one another around the output shaft 22 of the drive train 8. A tensioning idler 32 for the traction mechanism 12 is depicted in FIG. 3.

Figure 4:
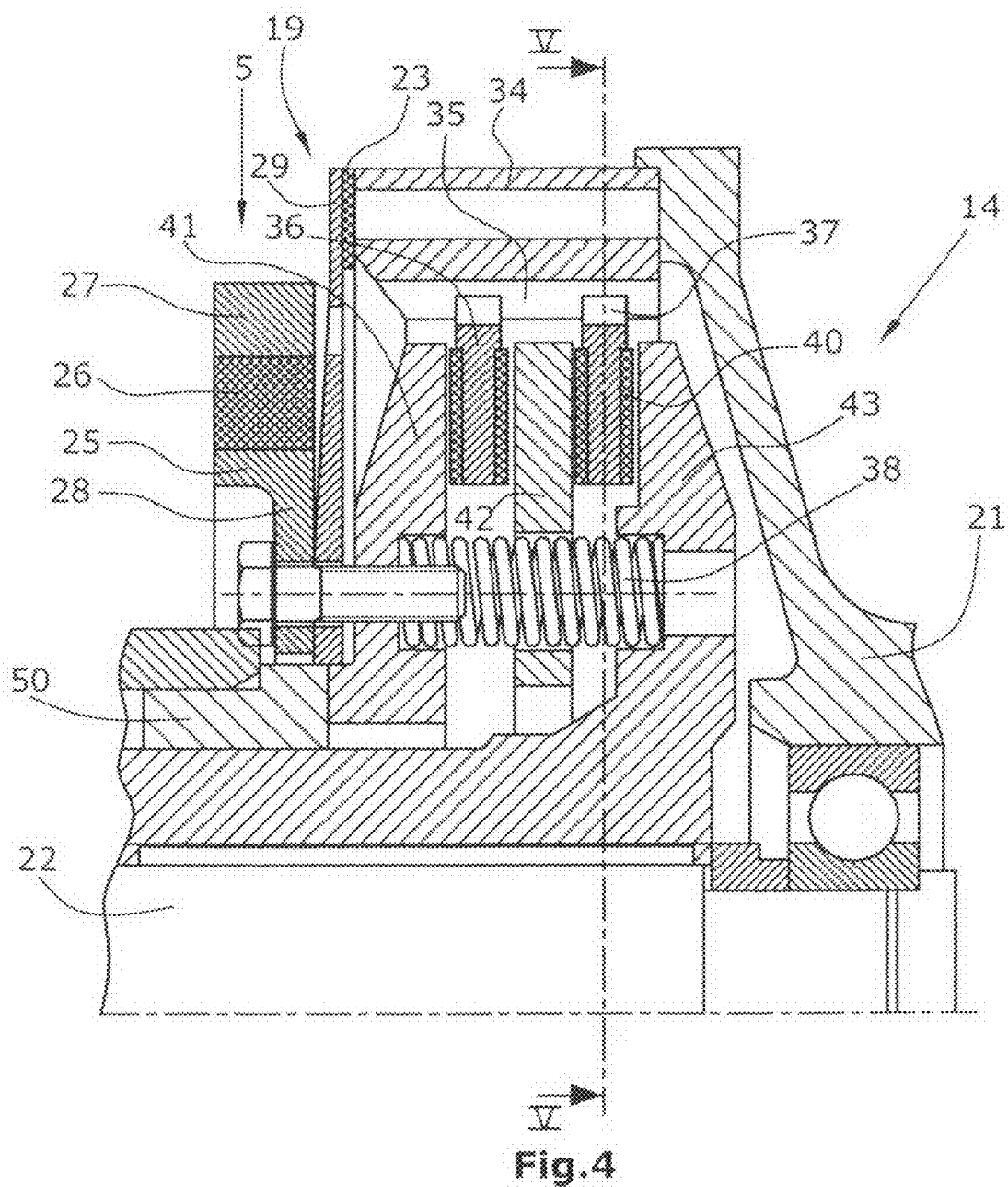
FIG. 4 is a clutch with braking device provided on the output side, as well as with an optional vibration damper.

FIG. 4 shows a conventional, preferably hydraulically operated clutch 14, with a braking device 19 additionally provided on the output side, which is capable of being additionally engaged immediately prior to, during or after switching of the clutch, and which may remain engaged until the engagement of the clutch has ended. The braking device 19 acts between the drive shaft 21 and the output shaft 22.

The drive shaft 21 is connected to a clutch part element 34 in the form of an outer hollow ring with an inner toothing 35, which is permanently engaged in a form-fitting manner with an inner clutch part element 36 with an outer toothing 37. Both clutch part elements 34, 36 may be designed as hollow rings. As can best be seen from FIGS. 4 and 6, the clutch part element 36 carries annular-shaped clutch linings 40 at the axial front surfaces, which can be engaged with clutch elements 41, 42, 43 on the output side by way of the coupling operation. An axially movable pressure piston 50 engages the movable clutch element 41, and is operable to engage the clutch 14 by compressing clutch elements 41, 42, 43 against clutch linins 40.

Figure 7:
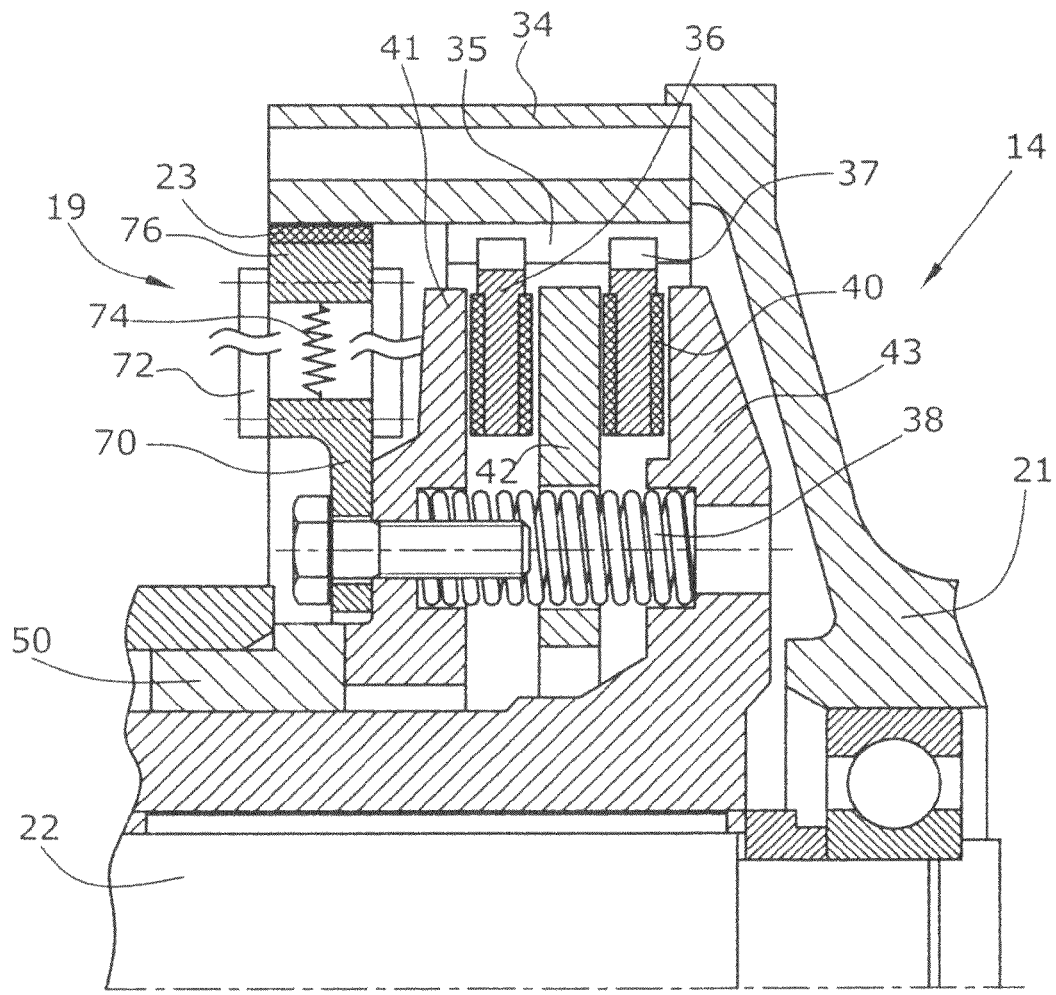
FIG. 7 is a clutch with radially acting braking device, vibration damper.

As can further be seen from FIGS. 4 and 7, two clutch part elements 36 movable in axial direction are provided in order to enable an increased torque transmission.

It is understood that more than two clutch part elements 36 or just one single clutch part element 36 may be provided as required. With a preferably hydraulic operation of the clutch 14, the axially movable clutch elements 41, 42 are pressed against the clutch linings 40 of the clutch part elements 36, with all parts jointly transmitting the force to a clutch element 43 that is coupled to the output shaft 22.

FIG. 4 shows the clutch 14 in a switching position in which the clutch linings 40 are not engaged yet, and the brake lining 23 of the braking device 19 is already resting against the axial front surface of the outer clutch part element 34. It is understood that the braking engagement may also take place after the engagement of the clutch. In that case, wear and tear of the brake lining 23 can be reduced significantly. It is essential that the toothing 35, 37 of the clutch part elements 34, 36 rest against one another in, for instance, the direction of the driving torque after the procedure of engaging the clutch, and are retained in that position by the braking device 19 even if a non-load operation is taking place during critical operation at low speed. In that way, it is ensured that the toothing 35, 37 cannot vibrate, for instance, in non-load operation, which enables the wear and tear of this mechanical coupling of the clutch part elements occurring due to the rotary vibrations can be reduced to a significant extent.

The arrangement of the braking device is not limited to the embodiment shown in FIG. 4; rather, it suffices that the braking device 19 acts between the drive side and the output side, thus precluding any play existing in the mechanical coupling by fixing the elements involved in their position so that they cannot move to and fro in relation to one another within the existing play due to the existing rotary vibrations.

Figure 5:
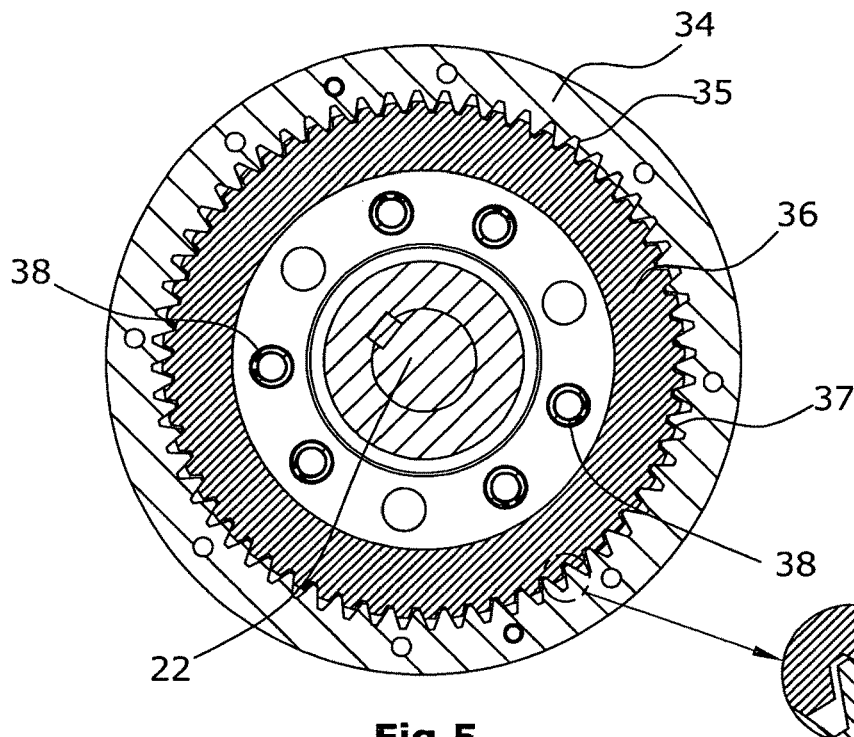
FIG. 5 is a section along the line V-V in FIG. 4.

When disengaging the clutch 14, the axially movable clutch elements 41 and 42 are pushed apart by means of, for instance, six pressure springs 38 that can be seen in FIG. 5, in which case the braking device 19, which is attached to the movable clutch element 41, with the brake lining 23 arranged at an annular flange 29 is also disengaged from the axial front surface of the outer clutch element 34. The annular flange 29 may be of an elastically deformable design in axial direction.

Figure 6:
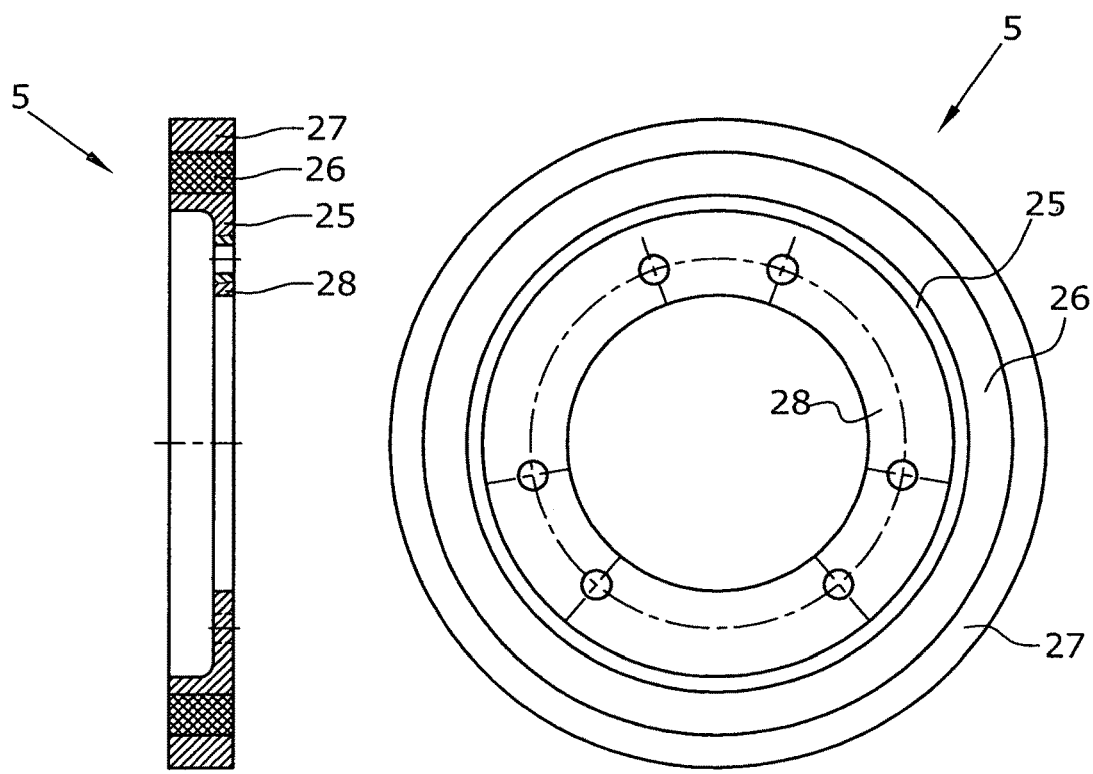
FIG. 6 is the vibration damper of the clutch according to FIG. 4.

FIG. 4 shows a preferably hydraulically operated clutch 14 to which a vibration damper 5 may be coupled on the output side that is fully depicted in FIG. 6 in a cross-sectional view and in a top view.

The vibration damper 5 consists of several concentric rings, with a first inner ring 25 being provided with a connecting device 28, for instance, a connecting flange. The first ring 25 is surrounded by an elastic element 26 which, in the embodiment, entirely surrounds the first ring peripherally.

The second ring 27, which runs concentrically and coaxially to the first ring 25, serves as flywheel mass and is in turn firmly attached to the elastic element 26 peripherally.

FIG. 6 shows a radial arrangement of the first inner ring 25, the elastic element 26, and the outer second ring 27. It is understood, however, that an axial arrangement of these rings 25, 26, 27 is also possible. Furthermore, the flywheel mass does not necessarily have to be of annular shape, but may also consist of several individual flywheel masses arranged symmetrically around the power-transmitting shaft. Furthermore, the first ring 25 may at the same time form the connecting device 28. Finally, a connecting device 28 not necessarily of annular shape may be provided in lieu of the first ring 25, which serves the purpose of coupling to a power-transmitting shaft and is connected in a non-rotating manner to the elastic element 26. At least one flywheel mass is then attached to the elastic element in a non-rotating manner and at a radial distance towards the outside.

The elastic element 26 may consist of an elastomer or else of metallic springs, for instance, disc springs, leaf springs, or coil springs, which act in the direction of the rotary vibrations.

When using the elastic element 26 in a clutch 14, a rigidity of 35000 Nm/rad to 45000 Nm/rad is preferred, with a value of 40000 Nm/rad having proved to be particularly suitable. The relative damping value then is between 0.15 and 0.2, preferably 0.175.

Because of the inertia of the vibration damper 5, the flywheel mass of the same counteracts the rotary vibrations of the combustion engine 10, damping or eliminating the same.

Figure 8:
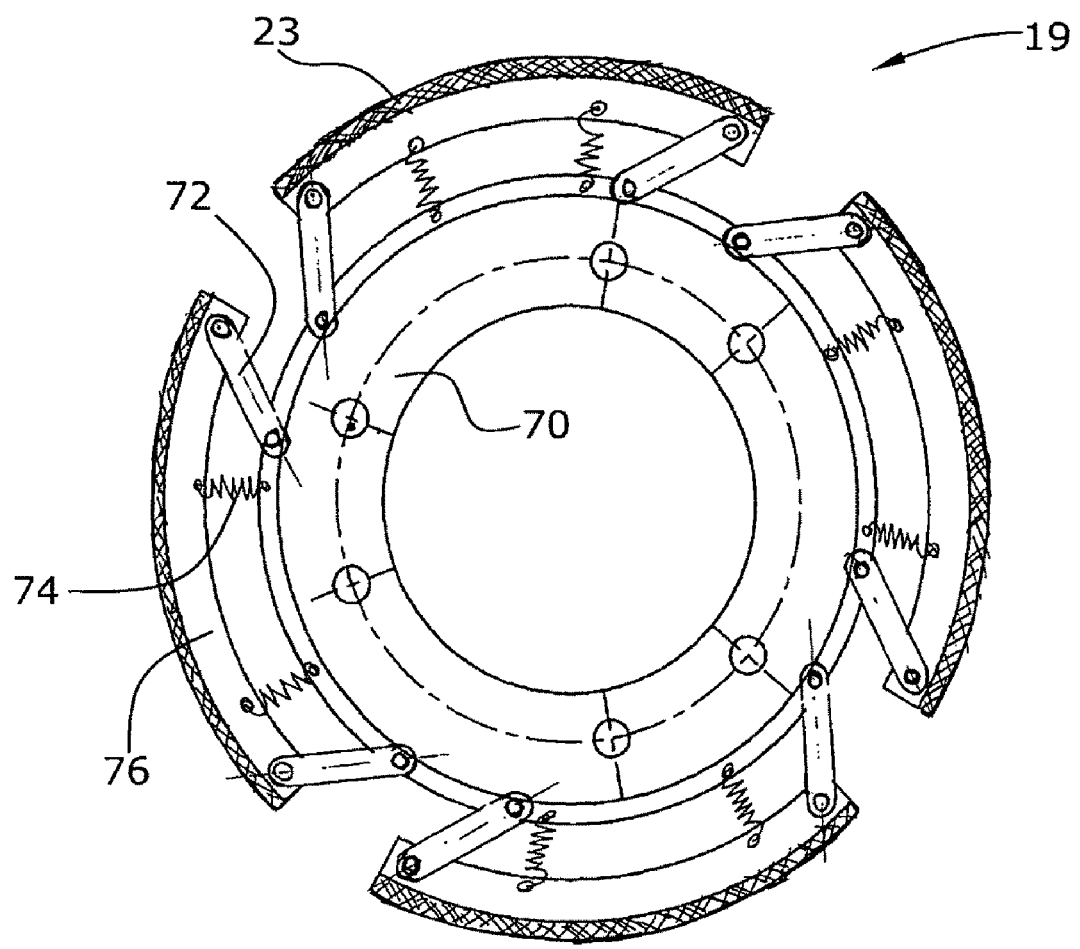
FIG. 8 is the radially acting braking device according to FIG. 7.

Alternatively, radially acting brake linings 23 may be provided, as can be seen from FIGS. 7 and 8, which when engaged rest against a circumferential surface of a clutch part element 34 on the drive side or output side.

FIG. 7 shows an embodiment with a braking device 19 that is capable of radial operation, the brake linings 23 of which may, under the influence of centrifugal forces, rest against an inner circumferential surface of the clutch part element 34, where the centrifugal force can be deflected from the output shaft 22.

The braking device 19 is depicted in detail in FIG. 8. The braking device 19 consists of an annular flange 70 which can be attached to, for instance, a movable clutch element 41, with four brake shoes 76, as they are in principle known from drum brakes, with radially outer brake linings 23 being connected in an articulated and swivelling manner to the annular flange 70 via coupling elements 72. Return springs 74 pull the brake shoes 76 towards the inside radially if there is no centrifugal force. During rotation of the output shaft 22, a centrifugal force is created with increasing speed, so that the brake shoes 76 are pressed towards the outside radially against the clutch part element 34 counteracting the force of the return springs 74.

The coupling elements 72 are aligned in such a manner that self-locking occurs in case of a brake engagement.

Although a preferred embodiment of the invention has been specifically illustrated and described herein, it is to be understood that minor variations may be made in the apparatus without departing from the spirit and scope of the invention, as defined by the appended claims.

What is claimed is:

1. A clutch for a construction machine, the construction machine having a machine frame, a working drum supported from the machine frame, a combustion engine supported from the machine frame, and a drive train including a drive shaft and an output shaft connecting the combustion engine and the working drum, the clutch comprising:

a drive side including at least one drive side clutch element connected to the drive shaft;

an output side including at least one output side clutch element connected to the output shaft;

wherein at least one of the drive side and the output side includes a fixed part and a movable part engageable with one another and having a rotational play therebetween; and a clutch brake operable during engagement of the clutch to provide a frictional rotational coupling force between the drive side and the output side to reduce relative rotational motion between the fixed part and the movable part the clutch brake being separate from the clutch elements and the clutch brake being configured such that the frictional rotational coupling force of the clutch brake is transmitted between the drive side and the output side without passing through the operably engaged clutch elements.

2. A construction machine, comprising:
a machine frame;
a working drum supported from the machine frame;
a combustion engine supported from the machine frame; and
a drive train connecting the combustion engine and the working drum so that the combustion engine drives the working drum, the drive train including a drive shaft, an output shaft and a clutch arranged between the drive shaft and the output shaft, the clutch including:
a drive side including at least one drive side clutch element;
an output side including at least one output side clutch element operably engageable with the at least one drive side clutch element to rotationally couple the drive shaft and the output shaft;
wherein the at least one drive side clutch element or the at least one output side clutch element includes an axially fixed part and an axially slidable part engaged with one another via a mechanical coupling having rotational play between the axial fixed and axially slidable parts about a rotational axis of the drive shaft; and
wherein the drive train further includes a clutch brake operable during engagement of the clutch to provide a frictional rotational coupling force between the drive side and the output side to eliminate or reduce relative rotational motion between the axially fixed part and the axially slidable part caused by the rotational play between the axially fixed part and the axially slidable part, the clutch brake being separate from the clutch elements so that the frictional rotational coupling force of the clutch brake is transmitted between the drive side and the output side without passing through the operably engaged clutch elements.

3. The machine of claim 2, wherein:
the machine has a load torque transferred from the drive shaft to the output shaft during a working mode when the working drum is working a ground surface;
the machine has a drag torque transferred from the drive shaft to the output shaft during a non-working mode when the working drum is rotating but not working a ground surface; and
the frictional rotational coupling force provided by the clutch brake is such that a braking torque transferred from the output shaft to the drive shaft via the clutch brake is smaller than the load torque and larger than the drag torque.

4. The machine of claim 2, wherein:
the frictional rotational coupling force provided by the clutch brake is such that a braking torque transferred between the output shaft and the drive shaft via the clutch brake is smaller than a maximum torque in a first rotational direction transferred from the drive shaft to the output shaft to rotate the working drum when the working drum is engaging a ground surface, and the braking torque is larger than any torque transferred from the output shaft back to the drive shaft in a second rotational direction opposite the first rotational direction due to rotational vibration of the drive train.

5. The machine of claim 2, wherein:
the frictional rotational coupling force provided by the clutch brake is such that a braking torque required to overcome the frictional rotational coupling force to rotationally move the axially fixed part relative to the axially slidable part within the rotational play therebetween is larger than a maximum torque transferred from the drive shaft to the output shaft to rotate the working drum when the working drum is in non-load operation not engaging a ground surface.

6. The machine of claim 2, wherein:
the frictional rotational coupling force provided by the clutch brake couples the axially fixed part and the axially slidable part sufficiently to eliminate the rotational play therebetween at least in the rotational direction of load transfer from the drive shaft to the output shaft.

7. The machine of claim 2, wherein:
the mechanical coupling between the axially fixed part and the axially slidable part includes at least one toothing.

8. The machine of claim 2, wherein:
the clutch brake includes at least one brake lining.

9. The machine of claim 2, wherein:
the clutch brake includes an annular flange elastic in axial direction and connected to either the drive side or the output side of the clutch;
the other of the drive side or the output side of the clutch includes an axial resting surface; and
in operation of the clutch brake, the annular flange frictionally engages the axial resting surface.

10. The machine of claim 2, wherein:
the at least one output side clutch element includes an axially movable output side clutch element; and
at least one part of the clutch brake is connected to the axially movable output side clutch element such that the at least one part of the clutch brake is non-rotatable relative to the axially movable output side clutch element.

11. The machine of claim 2, wherein:
the clutch brake is operable to frictionally engage either an axially end surface or a circumferential surface of one of the clutch elements.

12. The machine of claim 2, wherein:
the clutch includes a hydraulic piston operable to engage and axially move the at least one output side clutch element to engage the clutch and transmit power from the drive shaft to the output shaft.

13. The machine of claim 2, wherein:
the drive train further includes at least one vibration damper or vibration absorber between the combustion engine and the working drum, the vibration damper or vibration absorber being operable to eliminate or reduce rotary vibrations generated by the combustion engine.

14. The machine of claim 13, wherein:
the at least one vibration damper or vibration absorber is connected to the output side of the clutch.

15. The machine of claim 2, wherein:
the clutch brake includes a plurality of radially acting brake linings.

16. The machine of claim 2, wherein:
the clutch brake is operable through centrifugal forces during rotation of the output shaft.

* * * * *

UNITED STATES PATENT AND TRADEMARK OFFICE
CERTIFICATE OF CORRECTION

| | | |
|---|---|---|
| PATENT NO. | : 7,992,696 B2 | |
| APPLICATION NO. | : 12/219335 | |
| DATED | : August 9, 2011 | |
| INVENTOR(S) | : Axel Mahlberg, Lothar Schwalbach and Günter Hähn | |

It is certified that error appears in the above-identified patent and that said Letters Patent is hereby corrected as shown below:

Column 4, line 67, replace "linins" with --linings--.

Signed and Sealed this
Twenty-seventh Day of September, 2011

David J. Kappos
*Director of the United States Patent and Trademark Office*